United States Patent
Chan et al.

(10) Patent No.: US 10,778,596 B2
(45) Date of Patent: Sep. 15, 2020

(54) METHOD AND SYSTEM FOR STORING PACKETS FOR A BONDED COMMUNICATION LINKS

(71) Applicant: Pismo Labs Technology Limited, Hong Kong (HK)

(72) Inventors: Ho Ming Chan, Hong Kong (HK); Alex Wing Hong Chan, New Territories (HK); Kit Wai Chau, Hong Kong (HK); Patrick Ho Wai Sung, Kowloon (HK); Wan Chun Leung, Hong Kong (HK)

(73) Assignee: PISMO LABS TECHNOLOGY LIMITED, Kowloon (HK)

( * ) Notice: Subject to any disclaimer, the term of this patent is extended or adjusted under 35 U.S.C. 154(b) by 148 days.

(21) Appl. No.: 15/351,439

(22) Filed: Nov. 14, 2016

(65) Prior Publication Data

US 2017/0237676 A1 Aug. 17, 2017
US 2020/0195570 A9 Jun. 18, 2020

Related U.S. Application Data

(63) Continuation of application No. 13/822,637, filed as application No. PCT/CN2011/080512 on Oct. 4, 2011, now Pat. No. 9,497,135.

(51) Int. Cl.
*H04L 12/863* (2013.01)
*H04L 12/801* (2013.01)
(Continued)

(52) U.S. Cl.
CPC .......... *H04L 47/621* (2013.01); *H04L 43/087* (2013.01); *H04L 43/0894* (2013.01);
(Continued)

(58) Field of Classification Search
None
See application file for complete search history.

(56) References Cited

U.S. PATENT DOCUMENTS 5,701,427 A * 12/1997 Lathrop .............. H04L 12/1895
709/203
5,777,988 A * 7/1998 Cisneros .............. H04J 3/0632
370/238
(Continued)

FOREIGN PATENT DOCUMENTS

CN 101841480 A 9/2010
CN 102149140 A 8/2011

OTHER PUBLICATIONS

International Search Report of International Application PCT/CN2011/080512, dated Jul. 26, 2012.
(Continued)

*Primary Examiner* — Gregory B Sefcheck
*Assistant Examiner* — Suk Jin Kang
(74) *Attorney, Agent, or Firm* — Hershkovitz & Associates, PLLC; Abe Hershkovitz

(57) ABSTRACT

Method and system for storing packets received from a bonded communication links according to latency of the communication link that has the largest latency among all communication links of the bonded communication links. Embodiments of present inventions can be applied to bonded communication links, including wireless connection, Ethernet connection, Internet Protocol connection, asynchronous transfer mode, virtual private network, WiFi, high-speed downlink packet access, GPRS, LTE, and X.25. The present invention presents methods comprising the steps of estimating storage size of a queue, wherein the queue is for storage the one or more packets received from the bonded communication links. The storage size is based on one or more factors, including largest latency, bandwidth of
(Continued)

each of the plurality of communication links, and allowed time duration of packet storage.

20 Claims, 12 Drawing Sheets

(51) Int. Cl.
*H04L 12/26* (2006.01)
*H04L 12/841* (2013.01)
*H04L 12/891* (2013.01)
*H04L 12/823* (2013.01)

(52) U.S. Cl.
CPC .............. *H04L 47/28* (2013.01); *H04L 47/34* (2013.01); *H04L 47/41* (2013.01); *H04L 47/323* (2013.01)

(56) References Cited

U.S. PATENT DOCUMENTS

| | | | | |
|---|---|---|---|---|
| 6,094,683 A * | 7/2000 | Drottar | ............... | H04L 69/22 709/226 |
| 6,646,991 B1 * | 11/2003 | Drottar | ............... | H04L 7/02 370/238 |
| 6,687,840 B1 * | 2/2004 | Drottar | ............... | H04L 47/10 713/401 |
| 6,778,495 B1 * | 8/2004 | Blair | ............... | H04L 45/245 370/230 |
| 7,006,500 B1 * | 2/2006 | Pedersen | ............... | H04L 45/00 370/394 |
| 7,206,955 B2 * | 4/2007 | Drottar | ............... | H04L 47/10 713/401 |
| 7,295,639 B1 * | 11/2007 | Cory | ............... | G06F 13/4054 370/516 |
| 7,613,110 B1 * | 11/2009 | Blair | ............... | H04L 45/245 370/230 |
| 7,936,770 B1 * | 5/2011 | Frattura | ............... | H04L 49/90 370/351 |
| 2002/0184391 A1 * | 12/2002 | Phillips | ............... | H04L 12/1827 709/248 |
| 2003/0152094 A1 * | 8/2003 | Colavito | ............... | H04L 12/6418 370/412 |
| 2004/0042502 A1 * | 3/2004 | Drottar | ............... | H04L 7/02 370/509 |
| 2004/0062198 A1 * | 4/2004 | Pedersen | ............... | H04L 45/00 370/229 |
| 2004/0139239 A1 * | 7/2004 | Drottar | ............... | H04L 47/10 710/1 |
| 2005/0286424 A1 * | 12/2005 | Peeters | ............... | H04B 3/462 370/235 |
| 2006/0176900 A1 * | 8/2006 | Liu | ............... | H04Q 3/64 370/465 |
| 2006/0187834 A1 * | 8/2006 | Nichols | ............... | H04L 47/10 370/230 |
| 2006/0215689 A1 * | 9/2006 | Liu | ............... | H04Q 3/64 370/465 |
| 2006/0221974 A1 * | 10/2006 | Hilla | ............... | H04L 45/60 370/394 |
| 2008/0084819 A1 * | 4/2008 | Parizhsky | ............... | H04L 47/10 370/230 |
| 2009/0010315 A1 * | 1/2009 | Schedelbeck | ............... | H04L 7/0091 375/219 |
| 2010/0061264 A1 * | 3/2010 | Campbell | ............... | H04L 43/0852 370/253 |
| 2010/0098101 A1 * | 4/2010 | Drottar | ............... | H04L 1/0057 370/402 |
| 2011/0110359 A1 * | 5/2011 | Cooke | ............... | H04J 3/0638 370/350 |
| 2012/0044918 A1 * | 2/2012 | Ardhanari | ............... | H04L 47/2441 370/338 |
| 2012/0117273 A1 * | 5/2012 | Averi | ............... | H04L 45/00 709/248 |
| 2014/0219284 A1 * | 8/2014 | Chau | ............... | H04L 12/2867 370/394 |
| 2015/0003466 A1 * | 1/2015 | Soffer | ............... | H04L 47/125 370/412 |
| 2018/0063846 A1 * | 3/2018 | Akin | ............... | G06F 15/16 |

OTHER PUBLICATIONS

Written Opinion of the international Searching Authority of International Application PCT/CN2011/080512, dated Jul. 26, 2012.
First Office Action in Chinese Application No. 2011800675764, dated Jun. 30, 2015.

* cited by examiner

METHOD AND SYSTEM FOR STORING PACKETS FOR A BONDED COMMUNICATION LINKS

CROSS-REFERENCE TO RELATED APPLICATION

The present application is a non-provisional continuation-in-part application that claims the priority and benefits of and is based on U.S. application Ser. No. 13/822,637 titled "METHOD AND SYSTEM FOR REDUCTION OF TIME VARIANCE OF PACKETS RECEIVED FROM BONDED COMMUNICATION LINKS" filed on Jun. 20, 2013. The contents of the above-referenced application are herein incorporated by reference.

TECHNICAL FIELD

This invention relates in general to network communications and, more particularly, to a method and system for allocating storage for queue for processing packets received from bonded communication links according to latency difference among the bonded communication links and sequence numbers.

BACKGROUND ART

Network devices, such as routers, may be configured to distribute outgoing traffic, which may be originated from an application within a local area network or from a network device, across bonded communication links associated with multiple egress interfaces, logic connections, network tunnels, virtual private networks and etc. There are a few bonded communication links implementations, such as bonding, and PPP Multilink Protocol. Network traffic can be usually carried by packets through wired or wireless and public or private networks through bonded communication links. In order to allow a destination network device (DND) to determine the sequence of the packets, it is a common practice to assign a sequence number to each packet.

Each packet, when arriving at a DND, may experience different delay as each of the bonded communication links may have different latency and different amount of bandwidth available. Therefore packets may arrive at the DND in a bursty fashion and out-of-sequence. Also, some of the packets may never arrive at the DND because they are lost.

It is common that a DND may store the packets in a queue, which is implemented in a memory, temporarily in order to reduce the possibility that the packets delivered are not in sequence. However, current state-of-art implementations of delivering packets received in a bonded communication links network results in large time-variance and out-of-sequence packet delivery even with implementation of a queue. Further, the storage of the queue needs to be allocated for storing the packets. If the storage size is too large, some of computer resources may be wasted. If the storage size is too small, packets may be discarded too early.

Advantageous Effects

Network traffic received from bonded communication links are delivered to a device, a network interface or a process of a destination network device in sequence with higher probability and less time variance comparing to a destination network device without implementing this invention while an estimated storage space is allocated for storing packets.

SUMMARY OF THE INVENTION

The invention includes an implementation that reduces the time variance of delivering packets to a device, a network interface or a process of a destination network device (DND) according to latency difference among bonded communication links (Latency Difference). The sequence number (SEQ) of the packets received may also be used with latency difference to reduce the time variance. It is a common knowledge that a source network device (SND), which has the capabilities of distributing packets across bonded communication links, assigns consecutive SEQ to packets before sending the packets to the bonded communication links.

The value of Latency Difference is based on the time difference of packets with consecutive SEQ arriving at the DND through the bonded communication links. The value of Latency Difference may change as network conditions of bonded communication links change.

In one implementation, the DND delivers a packet without storing the packet to a queue if the packet is arriving from the one of the bonded communication links which has the largest latency.

In one implementation, at the DND, an expected SEQ (E-SEQ) is calculated based on Latency Difference and SEQ of the previous packets sent to a device, a network interface or a process of a destination network device. When a packet arrives at the DND, the DND compares the SEQ of the packet (P-SEQ) against the E-SEQ. If P-SEQ is smaller than E-SEQ, the packet is then delivered without storing the packet into a queue because the packet has arrived at the DND later than expected. If the packet arrives from one of the bonded communication links which has the largest latency and its P-SEQ is larger than the E-SEQ, the packet is then stored in a queue for later delivery because the packet is arrived earlier than expected. If the packet is from one of the bonded communication links with the largest latency and its P-SEQ is equal to the E-SEQ, all the packets in the queue with SEQ smaller than the P-SEQ, the packets, and packets with consecutive SEQ larger than the P-SEQ are then delivered to a network interface of the DND, a device or a process according to order of the SEQs in order to deliver the packets in sequence and reduce time-variance.

In one implementation, when packets are stored into the queue, each packet is assigned with a time tag to indicate a time for re-examination of the packet. When the packet is re-examined, a decision is then made to store the packet in the queue for a further period of time or to deliver the packet. If it is decided that the packet will be stored in the queue for a further period of time, the time tag is then updated to a new value

BRIEF DESCRIPTION OF DRAWINGS

The accompanying drawings, which are incorporated in and constitute a part of this specification, illustrate embodiments of the invention and, together with the description, explain the invention. In the drawings.

MODE(S) FOR CARRYING OUT THE INVENTION

Detailed Descriptions

Latency difference among bonded communication links is calculated by measuring the time difference of two packets, which are sent consecutively from a source network device, arriving at a destination network device through two of the bonded communication links. As these two packets arrive at the destination network device through two different links, each packet may arrive at the destination network device at different time due to different network conditions of these two different links and the time the packets leaving the source network device.

On the other hand, if consecutive packets are sent from the source network device to the destination network device through one of the bonded communication links, it is assumed that there is no latency difference between these consecutive packets because these two packets should experience similar network conditions.

As packets are continuously sent from the source network device to the destination network device, latency difference may not remain constant because of changing network conditions. In order to reduce the possibility of sudden change in latency difference, latency difference may be calculated statistically, including using an exponential weighted moving average algorithm to take into account of the past latency difference and the current latency difference.

In order to allow a destination network device to identify the correct sequence of packets arriving from bonded communication links, it is a common knowledge that source network device assigns a sequence number to each packet. The sequence number may be embedded in the payload in an Internet Protocol packet, a payload in X.25 network, a TCP header, in an OSI model layer three packets, or any part of a packet. The destination network device may decapsulate a packet before processing the packet, storing the packet into a queue, and/or delivering the packet. It is apparent to a skilled person in the art that different encapsulation and decapsulation methods and technologies may be used. It is also apparent to a skilled person in the art that when a packet is delivered by the destination network device, the delivery may be implemented in many ways, including sending the packet to a network interface of the destination network device, sending the packet to another device connected to the destination network device, passing the packet to an application, a process or a thread running inside the destination network device, and storing the packet for another application.

Figure 1A:
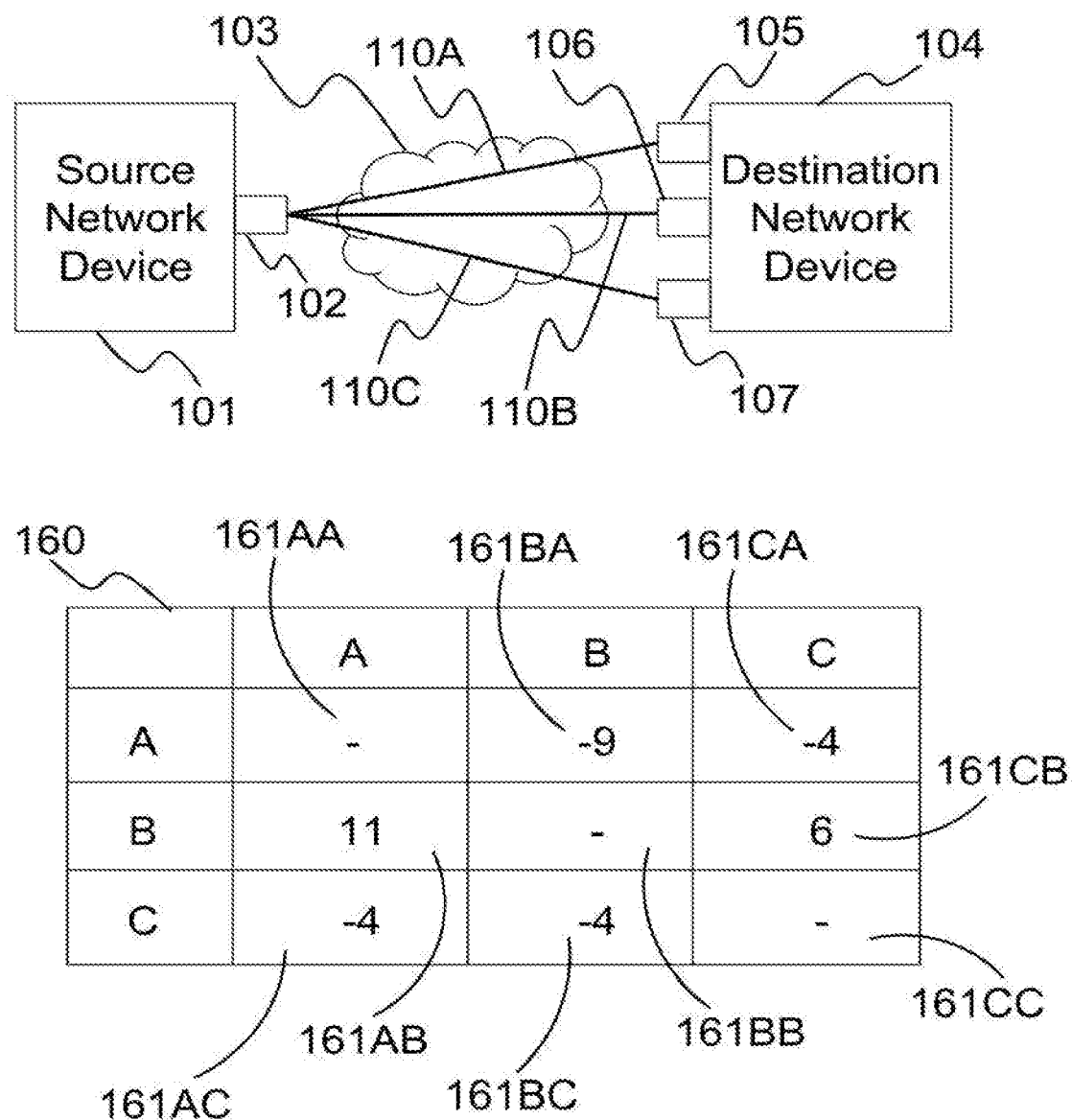
FIG. 1A is a network diagram illustrating three bonded communication links formed between one network interface of a source network device wand three network interfaces of a destination network device, and the corresponding exemplary matrix storing the latency differences among the three bonded communication links.

FIG. 1A is a network diagram illustrating three bounded communication links 110A, 110B and 110C connecting source network device 101 and destination network device 104 from network interface 102 at source network device 101 to three network interfaces 105, 106 and 107 at destination network device 104 through interconnected network 103 respectively. A source network device may include any device capable of distributing packets to one or bonded communication links, such as router, switch, mobile phone, multimedia device, and computer. The type of a communication link may include any physical connection and/or logical connection connecting a source network device and destination network device, such as a wireless connection, Ethernet connection, Internet Protocol connection, asynchronous transfer mode, virtual private network, WiFi, high-speed downlink packet access, GPRS, LTE and X.25, connecting a source network device and destination network device. A destination network device may include any device capable of processing packets receiving from one or more links, such as a router, switch, mobile phone, multimedia device, or computer. For example, link 110A may pass through a WiFi connection, link 110B and link 110C may use the same type of GPRS transport but over two different service providers. Interconnected network 103 includes Internet, intranet, private networks, public networks or combination of private and public networks.

A memory 160 is used to store the time difference of packets with consecutive sequence numbers arriving at destination network device 104 from different links. Cell 161AA to cell 161CC are part of memory 160. The stored time difference in memory 160 may be used to estimate the latency difference among different links. For example, a packet P1, with a sequence number one, originating from source network device 101 first travels through link 110A to arrive at destination network device 104. The next packet after P1, namely P2, originating from source network device 101 travels from link 110B to arrive at destination network device 104. The time difference between the arrivals of P1 and P2 at destination network device 104 is then stored in cell 161AB of memory 160 as P1 and P2 are packets with consecutive sequence numbers arriving at destination network device 104 from link 110A and link 110B respectively.

Another example, if a packet with sequence number three, namely P3, arrives at destination network device 104 through link 110B, the time difference between P2 and P3 arriving at the destination network device 104 is not stored in memory 160 because P2 and P3 arrive at destination network device 104 through the same link. Similarly, if a packet with sequence number four, namely P4, arrives at the destination network device 104 through link 110A, the time difference between the arrivals of P3 and P4 at the destination network device 104 is stored in cell 161BA of memory 160.

When packets from source network device 101 first arrive at destination network device 104, memory 160 may be empty. In order to calculate the time differences among all links, for example, source network device 101 may deliver packets with consecutive sequence numbers to destination network device 104 in the order of link 110A, link 110B, link 110C, link 110B, link 110A, link 110C and link 110A and the arrival time of the packets at destination network device 104 are recorded respectively. The time difference between packets' arrival time, in the order of arrival, which are the following sets: 110A and 110B, 110B and 110C, 110C, and 110B, 110B and 110A, 110A and 110C, and finally 110C and 110A may then be stored in cell 161AB, cell 161BC, cell 161CB, cell 161BA, cell 161AC and cell 161CA respectively. When links are added or deleted between source network device 101 and destination network device 104, the value stored in memory 160 may be reset to zero.

There is no value to be stored in cell 161AA, 161BB and 161CC because it is assumed that there is no latency difference for two consecutive packets being sent to destination network device through the same link.

For example, if the latencies in links 110A, 110B and 110C are ten milliseconds, twenty milliseconds and fifteen milliseconds respectively, and consecutive packets are sent from source network device 101 every one milliseconds, the values in cell 161AA, 161AB, 161AC, 161BA, 161BB, 161BC, 161CA, 161CB, and 161CC will then become null, eleven, six, minus nine, null, minus four, minus four, six and null respectively. When the first packet is sent from source network device 101 through 110A, the first packet may then arrive at destination network device 104 ten milliseconds later. When the second packet is sent from source network device 101 one millisecond later through 110B, the second packet may then arrive at destination network device 104 twenty milliseconds later, or eleven seconds after the first packet's arrival at destination network device 104 because the latency difference between link 110A and 110B is ten milliseconds and the second packet is sent one second after the first packet is sent from source network device 101. Therefore, the value in cell 161AB is eleven. Similarly, when the third packet is sent from source network device 101 through 110B, the third packet may then arrive at destination network device 104 twenty milliseconds later. When the fourth packet is sent from source network device 101 one millisecond later through 110C, the packet may then arrive at destination network device 104 fifteen milliseconds later, or four seconds earlier than the third packet's arrival at destination network device 104 because the latency difference between link 110B and 110C is minus five milliseconds and the fourth packet is sent one second after the third packet is sent from source network device 101. Therefore, the value in cell 161BC is minus four.

Figure 1B:
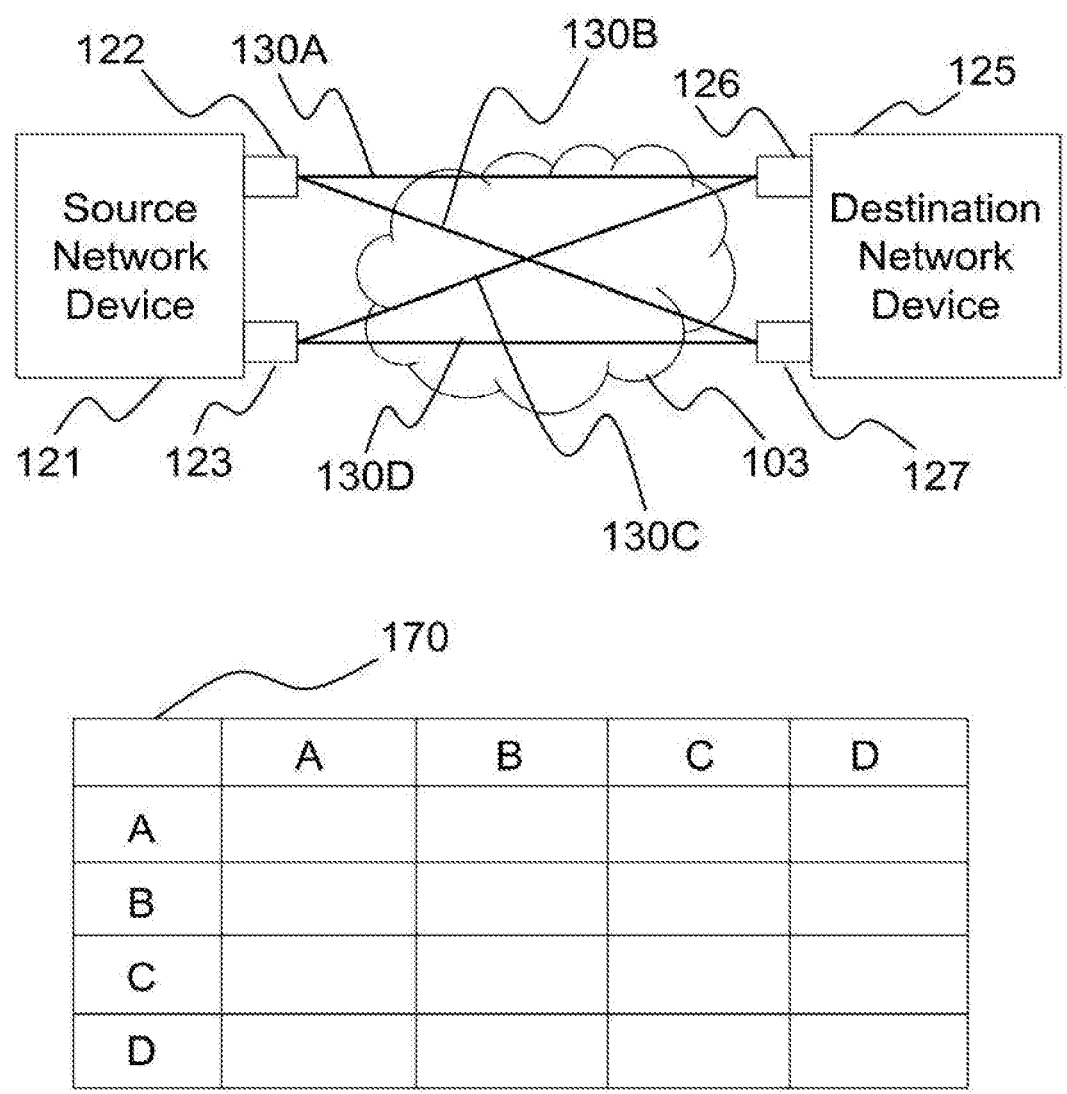
FIG. 1B is a network diagram illustrating four bonded communication links formed between two network interfaces of a source network device and two network interfaces of a destination network device, and the corresponding exemplary matrix storing the latency differences among the four bonded communication links.

FIG. 1B is a network diagram illustrating four bonded communication links 130A, 130B, 130C and 130D connecting source network device 121 and destination network device 125 through network interfaces 122 and 123 at source network device 121 and network interfaces 126 and 127 at destination network device 125. A memory 170 is used to store the time difference of two packets with consecutive sequence number arriving from different links.

Figure 1C:
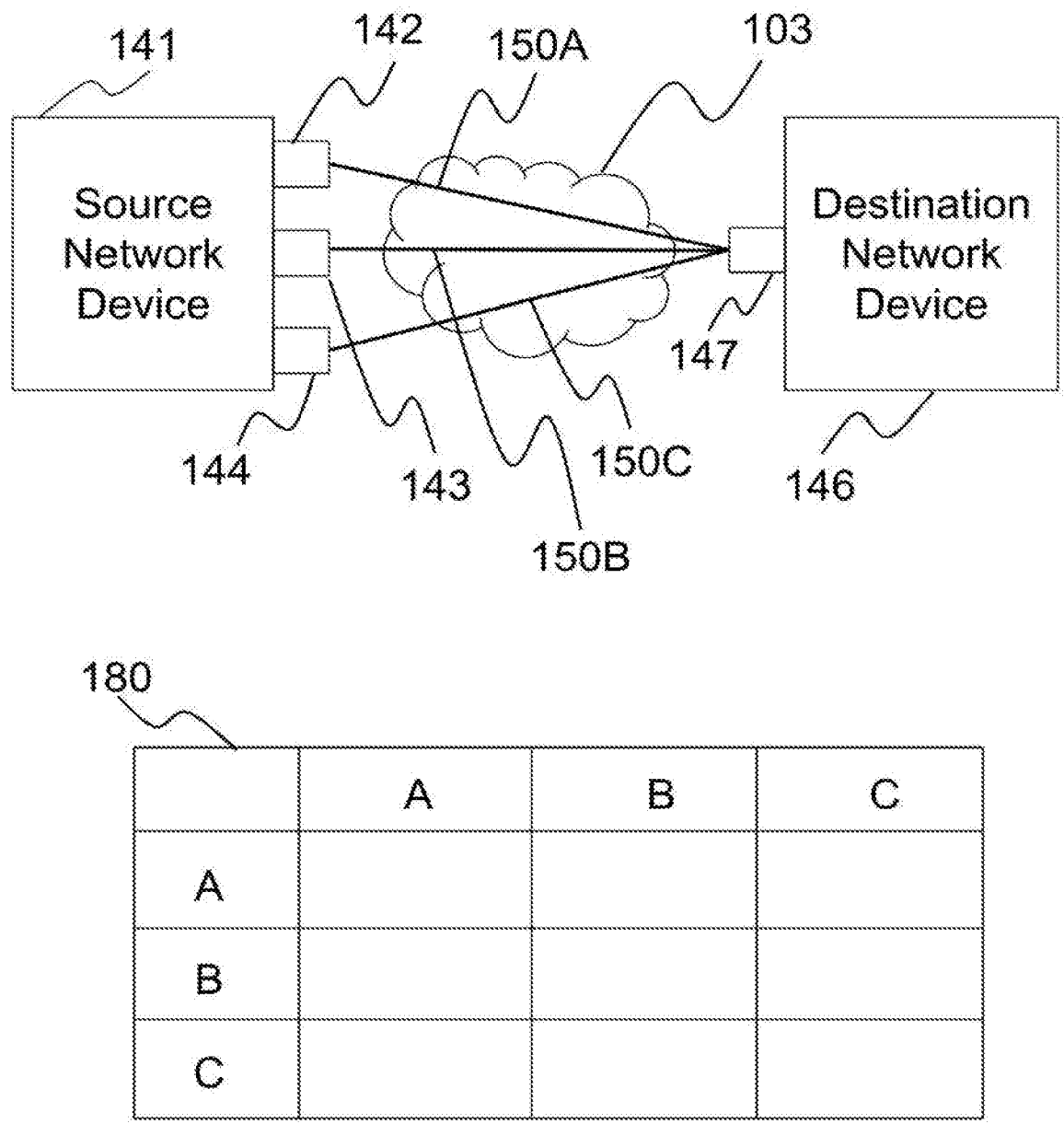
FIG. 1C is a network diagram illustrating three bonded communication links formed between three network interfaces of a source network device and one network interface of a destination network device, and the corresponding exemplary matrix storing the latency differences among the three bonded communication links.

FIG. 1C is a network diagram illustrating three bonded communication links 150A, 150B, and 150C connecting source network device 141 and destination network device 146 through network interfaces 142, 143 and 144 at source network device 141 and network interfaces 147 at destination network device 146. A memory 180 is used to store the time difference of two packets with consecutive sequence numbers arriving from different links.

Figure 2:
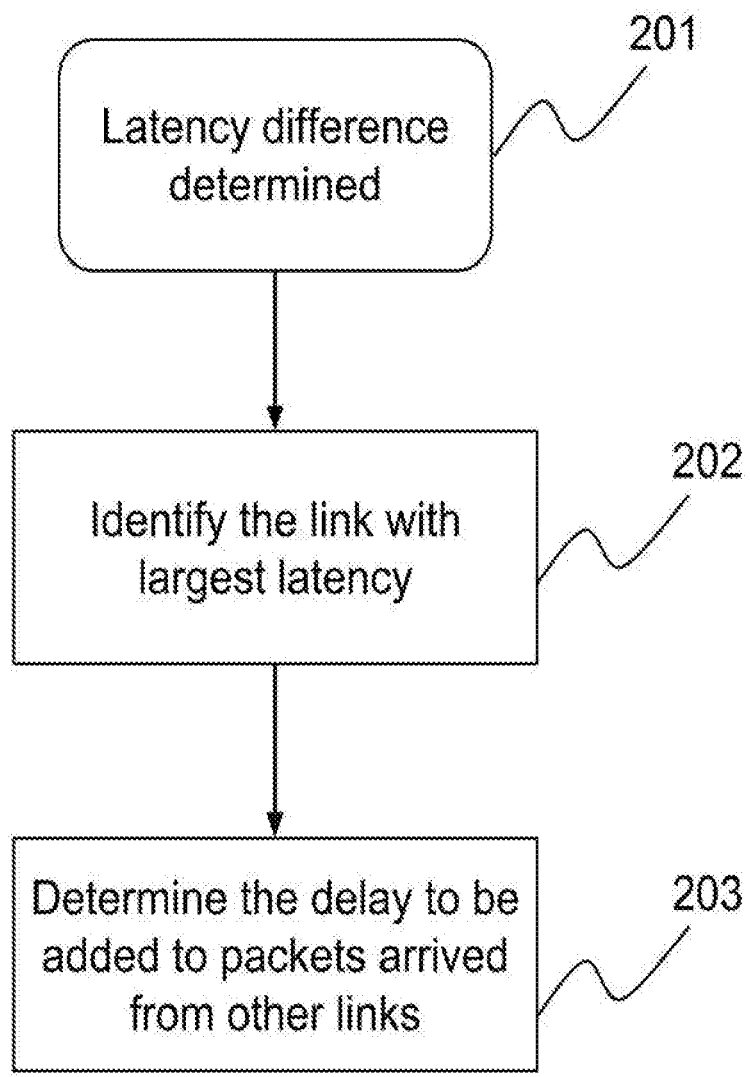
FIG. 2 is a flow chart illustrating a method used to calculate the latency differences.

FIG. 2 is a flow chart illustrating a method used to determine the delay, based on latency difference determined, to be added to packets arrived from links not with the largest latency. When latency differences among all links in a bonded communication links network are determined at functional block 201, the link with the largest latency can then be determined at functional block 202. For example, as the largest values of column A, column B and column C of memory 160 are eleven, minus four and six respectively, the link with the largest latency is link 110B because column B has the smallest value among all the columns.

The next step is to determine the amount of delay to be added to packets arriving from different links at functional block 203. In one embodiment, in order to reduce time variance when delivering packets, packets arrived through link 110A are delayed for eleven milliseconds, representing the largest cell value in column A and the sum of latency difference and the time difference between two consecutive packets leaving source network device 101. Similarly, packets arrived through link 110C are delayed for six milliseconds, representing the largest cell value in column C and the sum of latency difference and the time difference between two consecutive packets leaving source network device 101. However, for packets arriving through 110B, these packets are delivered without delay because link 110B has the largest latency.

In one embodiment, the time difference between two packets with consecutive sequence numbers arriving from two different links may be computed with the values stored in memory 160 in order to update the values stored in memory 160. For example, the original value in cell 161AB is eleven, which may indicate the sum of the latency difference between link 110A and link 110B and the time difference between two consecutive packets leaving source network device 101 was eleven milliseconds, and the latency difference between the most recently received consecutive packets arriving from link 110A and 110B is twenty milliseconds, value in cell 161AB is then updated to a new value according to an algorithm, for example exponential weighted moving average, in order to take into account of the recent twenty milliseconds latency difference experienced in link 110A and link 110B. It is apparent to a skilled person in the art that other algorithms may be used as well.

In one embodiment, when the time difference between two consecutive packets sent from source network device 101 is unknown, destination network device 104 may treat the value stored in the cells of memory 160 as latency difference, without taking into account of the time difference between two consecutive packets sent from source Memory 160, 170, and 180 may be implemented by using DRAM, SDRAM, Flash RAM, optical memory, magnetic memory, hard disk, and/or any other materials that are able to provide storage capability. The calculation of latency difference may be implemented by using one or more CPUs, ASICs, MCUs, microprocessors, and/or any devices that are able to provide arithmetical functions.

When a packet has arrived at a destination network device, the destination network device first determines which one of bonded communication links the packet has arrived from. If the packet has arrived from a link with the largest latency, the packet is then delivered. However, it is possible that there are other packets which have sequence numbers smaller than the sequence number of the packet already being stored in a storage system of the destination network device. These packets may have arrived at the destination network device earlier than the packet through other bonded communication links. In order to have in-sequence packet delivery, these packets are delivered before the packet.

If the packet has arrived from a link not with the largest latency, the packet may then be stored into a queue of a storage system of the destination network device for later delivery. The period of the storage time in the queue of the storage system of the destination network device depends on latency difference in order to reduce time variance when delivering packets. The implementation of the queue and/or the storage system may use DRAM, SDRAM, Flash RAM, optical memory, magnetic memory, hard disk, and/or any other materials that are able to provide storage capability.

Method

Figure 3:
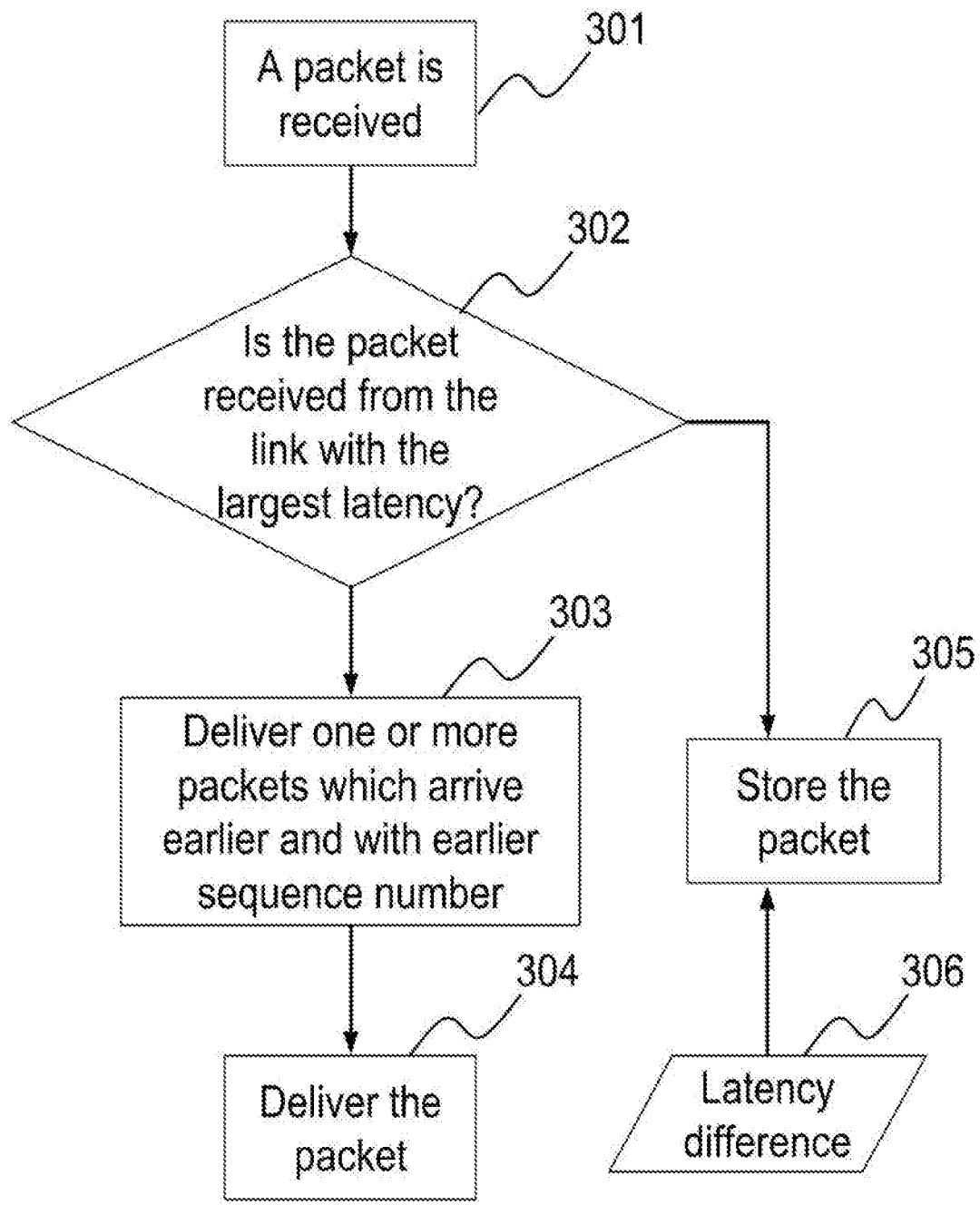
FIG. 3 is a flow chart illustrating a method according to an embodiment of the present invention used to determine whether to deliver or to store a packet, which is received from one of the bonded communication links.

FIG. 3 is a flowchart illustrating a method for processing packets received from bonded communication links according to the latency difference among the bonded communication links and sequence numbers of the packets received. When a packet arrives at a destination network device at functional block 301 through one of the bonded communication links, the destination network device determines whether the packet arrives from the link with the largest latency at decision block 302. If the packet arrives from the link with the largest latency, packets which have been stored in the queue earlier at functional block 305 with sequence numbers smaller than the sequence number of the packet will be delivered at functional block 303 and followed by the delivery of the packet at functional block 304. If the packet arrives not from the link with the largest latency, the packet is stored in a queue at functional block 305 for a period of time depending on the latency difference 306.

Figure 4:
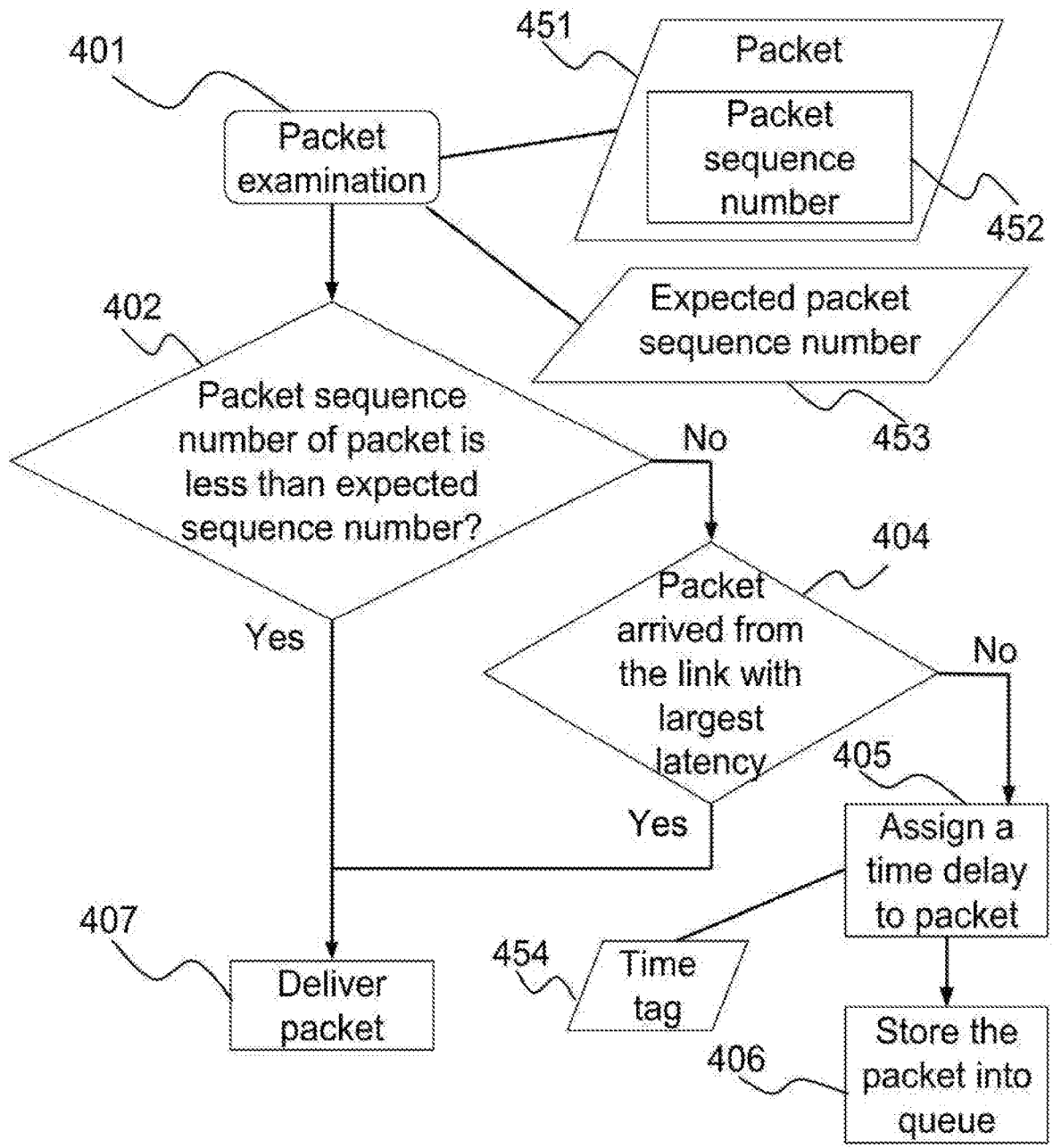
FIG. 4 is a flow chart illustrating a method according to an embodiment of the present invention used to determine whether to deliver or to store a packet, which is received from one of the bonded communication links, according to the sequence number of the packet and an expected sequence number.

FIG. 4 is a flowchart illustrating a method for processing packets received from bonded communication links according to the latency difference among the bonded communication links, sequence numbers of the packets received and an estimated sequence number.

Estimated sequence number may be used to predict what SEQ the next packet should be. Estimated sequence number may also be used to identify whether a packet should be delivered if the sequence number of the packet is compared differently to the estimated sequence number. Using this estimated sequence number in this invention assists the determination whether a particular packet inside the queue may be delivered or the delay of the packet delay is being determined accurately.

In functional block 401, packet 451 arrives at a destination network device through one of the bonded communication links. The sequence number of packet 451 is sequence number 452. In decision block 402, if packet 451 with sequence number 452 is less than the expected sequence number 453, packet 451 is then delivered in functional block 407 because packet 451 is considered arriving late. Alternatively, in decision block 404, if packet 451 arrives from the link with the largest latency, it is then delivered in functional block 407. If packet 451 arrives from a link other than the link with the largest latency, a time tag 454 at functional block 405 is then assigned to correspond to the period of time that packet 451 is expected to be stored in the queue at functional block 406.

The value of a time tag is based on the latency difference. Using FIG. 1 as an illustration for an implementation, if packet 451 arrives at destination network device through link 110A and its sequence number 452 is larger than expected sequence number 453, packet 451 is stored in the queue and the value of time tag 454 is eleven because the largest value in column A of memory 160 is eleven.

Once a packet has been stored in the queue, its associated time tag is examined periodically to determine whether the packet should be examined for delivery. However, a packet may be delivered even before it is being examined or may continue to be stored in the queue after it is being examined if it is found that the latency difference estimation may not be accurate or become outdate when network conditions of the bonded communication links change. In order to avoid a packet being stored for longer than necessary when latency difference estimation is not accurate, expected sequence number may be compared to the sequence number of the packet, and the value of the smallest sequence number of the packets stored in the queue may also be compared to the sequence number of the packet. A time limit threshold may also be used to prevent the packet has been stored in the queue too long. After a packet is removed from the queue, the packet is then delivered. The value of the time limit threshold may be determined by the destination network device, entered by an administrator or pre-defined by the manufacturer of the destination network device.

Figure 5:
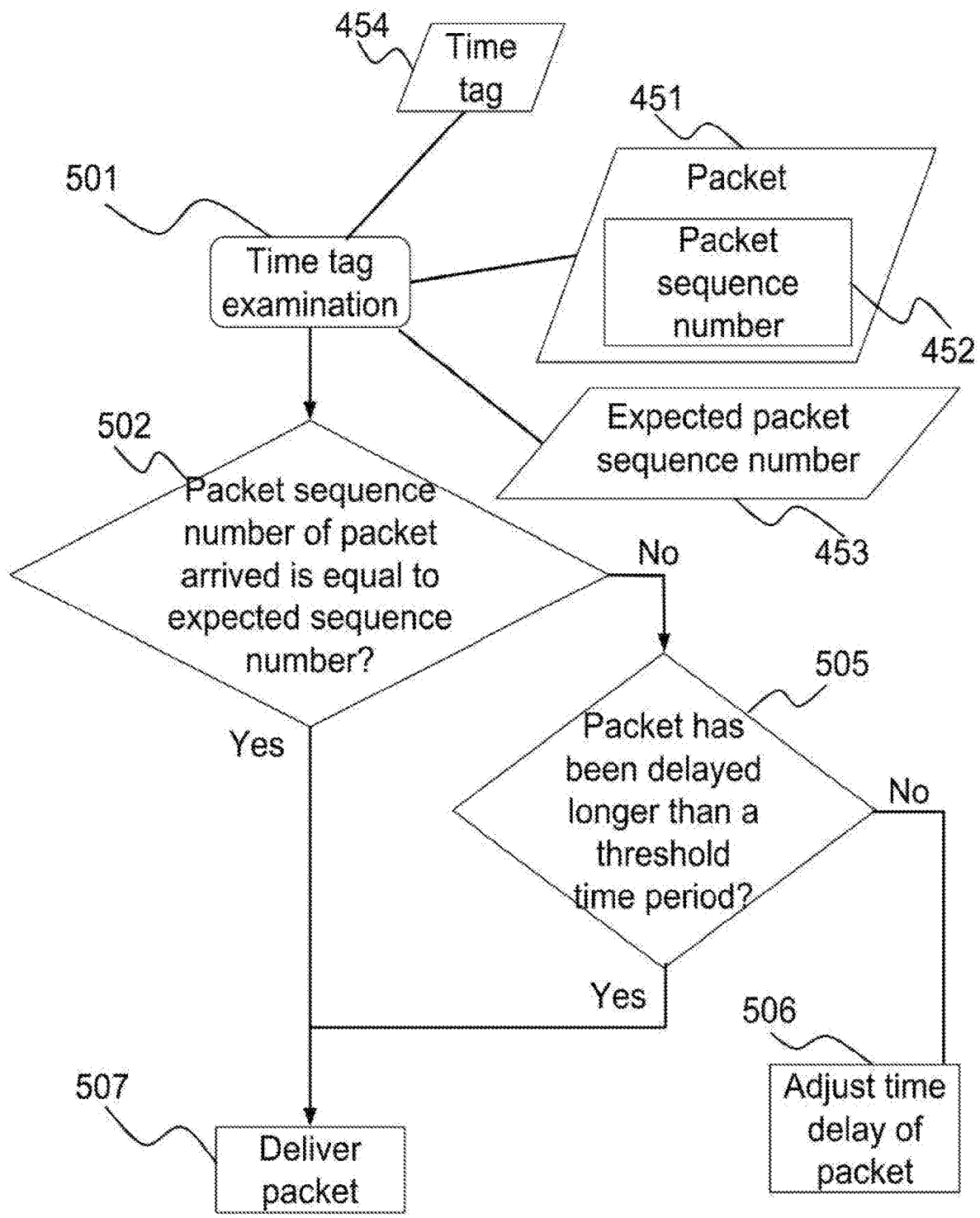
FIG. 5 is a flow chart illustrating a method according to an embodiment of the present invention used to determine whether to deliver or to store a packet, which is received from one of the bonded communication links, with a new time tag.

FIG. 5 is a flowchart illustrating a method for processing a packet which has been stored in a queue of a destination network device. The time period for a packet staying in the queue may take into the account of latency difference 306, time tag 454, and/or a pre-defined value.

In functional block 501, time tags of packets are periodically examined, for example for every five milliseconds, to identify packets which may be ready for delivery. For example, when time tag 454, which is the time tag of packet 451, has indicated that packet 451 should be examined, functional block 501 identifies packet 451 for decision block 502. In decision block 502, sequence number 452 is compared against expected sequence number 453. If sequence number 452 is equal to expected sequence number 453, it means that the estimation of latency difference may still be accurate. Therefore, packet 451 is ready for delivery in functional block 507.

If sequence number 452 is not equal to expected sequence number 453 in decision block 502, it may be an indication that the estimation of latency difference may become inaccurate. Time tag 454 is examined whether packet 451 has been stored in the queue longer than a time limit threshold in decision block 505. The time limit threshold may be any value estimated by any device, selected by the device manufacturer, or inputted by a user of destination network device. According to experimental results, the optimal value for time limit threshold for 3G mobile link is in the range of seven hundred milliseconds to eight hundred milliseconds, whereas a typical ADSL or cable Ethernet link is in the range of two hundred and fifty milliseconds to three hundred milliseconds. If packet 451 has been stored in the queue for a period of time more than the time limit threshold in decision block 505. Therefore, packet 451 is ready for delivery in functional block 507.

If packet 451 has been stored in the queue for a period of time not more than the time limit threshold in decision block 505, packet 451 may be stored in the queue for a further period of time. The value of time tag 454 is then modified to a new value in functional block 506 that allows to postpone the delivery of packet 451. The new value of time tag 454 should allow packet 451 to be re-examined within a time period which does not result in out-of-sequence delivery of packet 451. In one embodiment, the new value of time tag 454 is set to be five milliseconds, such that packet 451 will then be re-examined five milliseconds later and latency difference estimation may then also be updated.

In one embodiment, the step of decision block 502 is skipped. When a packet is examined, the only criterion to determine whether the packet should be stored or delivered is whether the packet has been stored in the queue for more than a time limit threshold in decision block 505.

Figure 6:
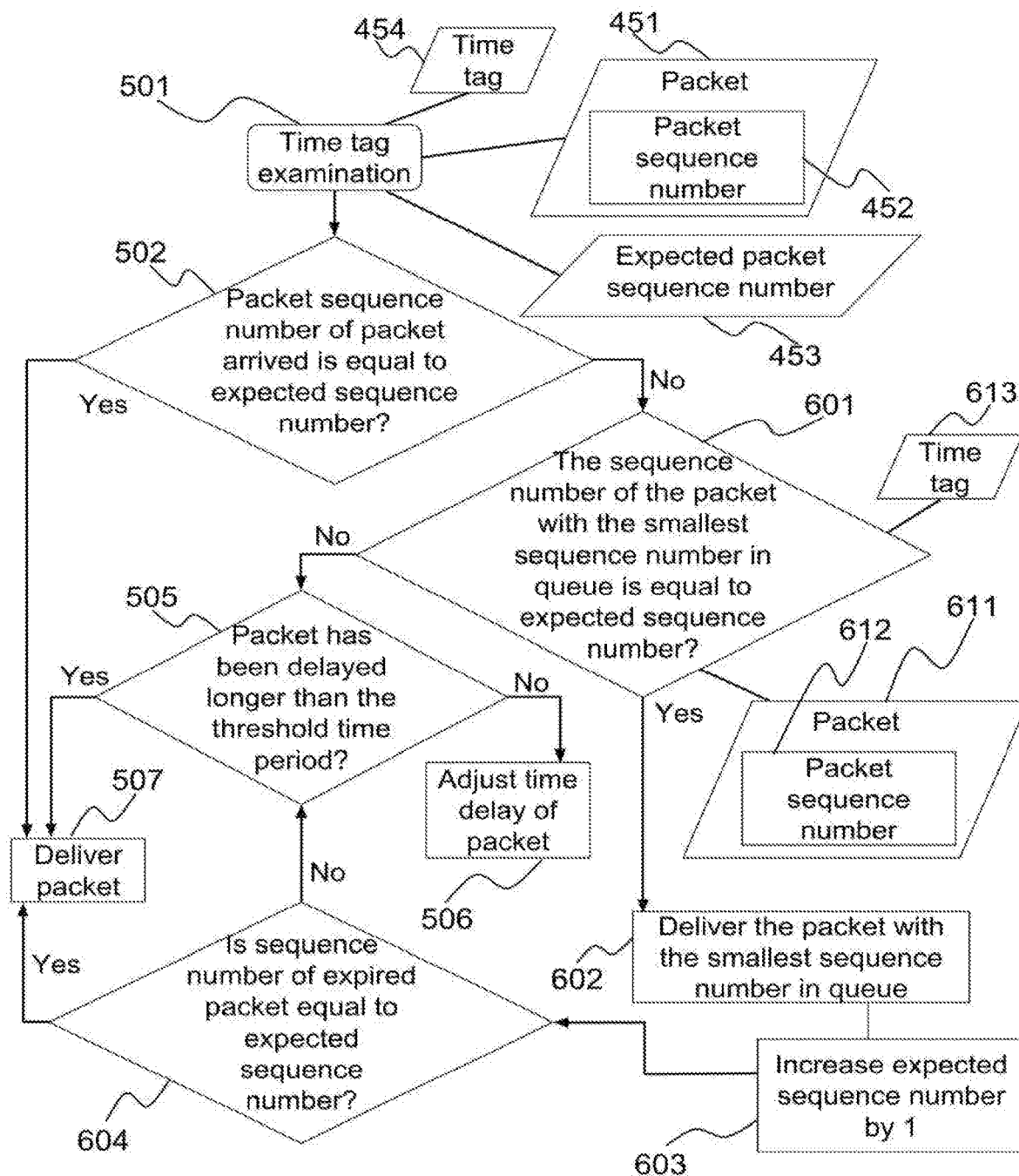
FIG. 6 is a flowchart illustrating a method according to an embodiment of the present invention, for processing packets, which have been stored in a queue of a destination network device, to further reduce time variance when delivering packets.

FIG. 6 is a flowchart illustrating a method, based on the method shown in FIG. 5, for processing a packet which has been stored in a queue of a destination network device by taking into account of the sequence numbers of packets stored in the queue. Decision block 601, functional block 602, functional block 603 and decision block 604 are added among decision block 505, functional block 506 and functional block 507 shown in FIG. 5. If sequence number 452 is not equal to expected sequence number 453 in decision block 502, the sequence number of the packet with the lowest sequence number stored in the queue, for example packet 611, is compared against expected sequence number 453 at decision block 601. The sequence number and time tag of packet 611 are sequence number 612 and time tag 613 respectively.

If sequence number 612 is equal to expected sequence number 453 in decision block 601, packet 611 is removed from the queue for delivery in functional block 602. Further, expected sequence number 453 is increased by one to indicate that one packet has been removed from the queue in functional block 603. Expected sequence number 453 is then compared against sequence number 452 in decision block 604. If expected sequence number 453 is equal to sequence number 452, it means that the estimation of latency difference is still valid. Therefore packet 451 is ready for delivery in functional block 507.

If sequence number 612 is not equal to expected sequence number 453 in decision block 604, time tag 454 is examined whether packet 451 has been stored in the queue for more than a time limit threshold in decision block 505. Steps to be performed at and after decision block 505 are identical to the corresponding steps in FIG. 5.

In one embodiment, function block 601, function block 602, function 603 and decision block 604 are visited only when sequence number 612 is found to be equal to expected sequence number 453 at decision block 504 for a predefined number of iterations, for example twice. This implementation helps reducing the possibility for holding packets too long in the queue when the estimation of latency difference becomes out-dated.

Figure 7:
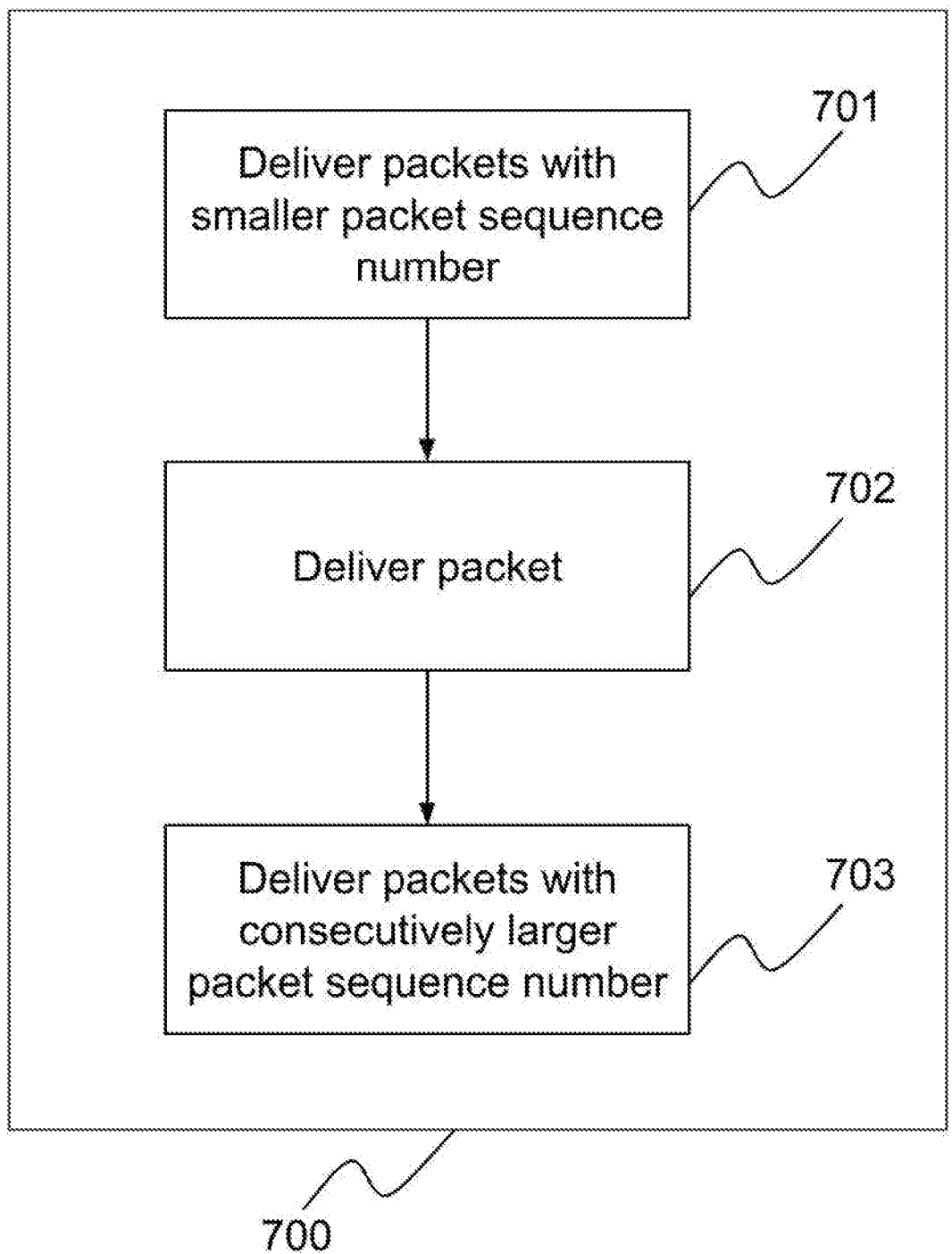
FIG. 7 is a flowchart illustrating a method according to an embodiment of the present invention of delivering a packet.

FIG. 7 is a flowchart illustrating a method of delivering a packet in functional block 407 and functional block 507. Functional block 700 provides functions identical to functional block 407 and functional block 507

When a packet is identified for delivery, there may be one or more packets stored in the queue with sequence numbers smaller or larger than the sequence number of the packet. This may be due to a few reasons, including changing bonded communication links network environment, invalid latency estimation and packet loss. In one embodiment, in order to reduce out-of-sequence packet delivery, if there is one or more packets stored in the queue with sequence numbers smaller than the sequence number of the packet, these packets are delivered first in functional block 701 and then followed by the delivery of the packet in functional block 702. If there is one or more packets stored in the queue with sequence numbers consecutively larger than the sequence number of the packet, these packets are delivered in block 703 after the packet is delivered in block 702.

When a packet is delivered and its sequence number is larger than expected sequence number 453, expected sequence number 453 is updated to the sequence number of the packet plus one to indicate the sequence number of the next packet expected to be delivered. When more than one packet are delivered, expected sequence number 453 is updated to the largest sequence number of the packets plus one to indicate that the sequence number of the next packet expected to be delivered.

System

A system may have one or more ingress interfaces for receiving packets and one or more egress interfaces for sending packets. An interface may be able to perform both roles of ingress interface and egress interface. A system may also have one or more control modules. For example, one control module is responsible for network interface and one control module is responsible for data storage system. The control modules may communicate among themselves. It is also possible that one control module is responsible for all control mechanisms in the system. It is apparent to a skilled person in the art that one or more control modules can be implemented in many variations.

Figure 8:
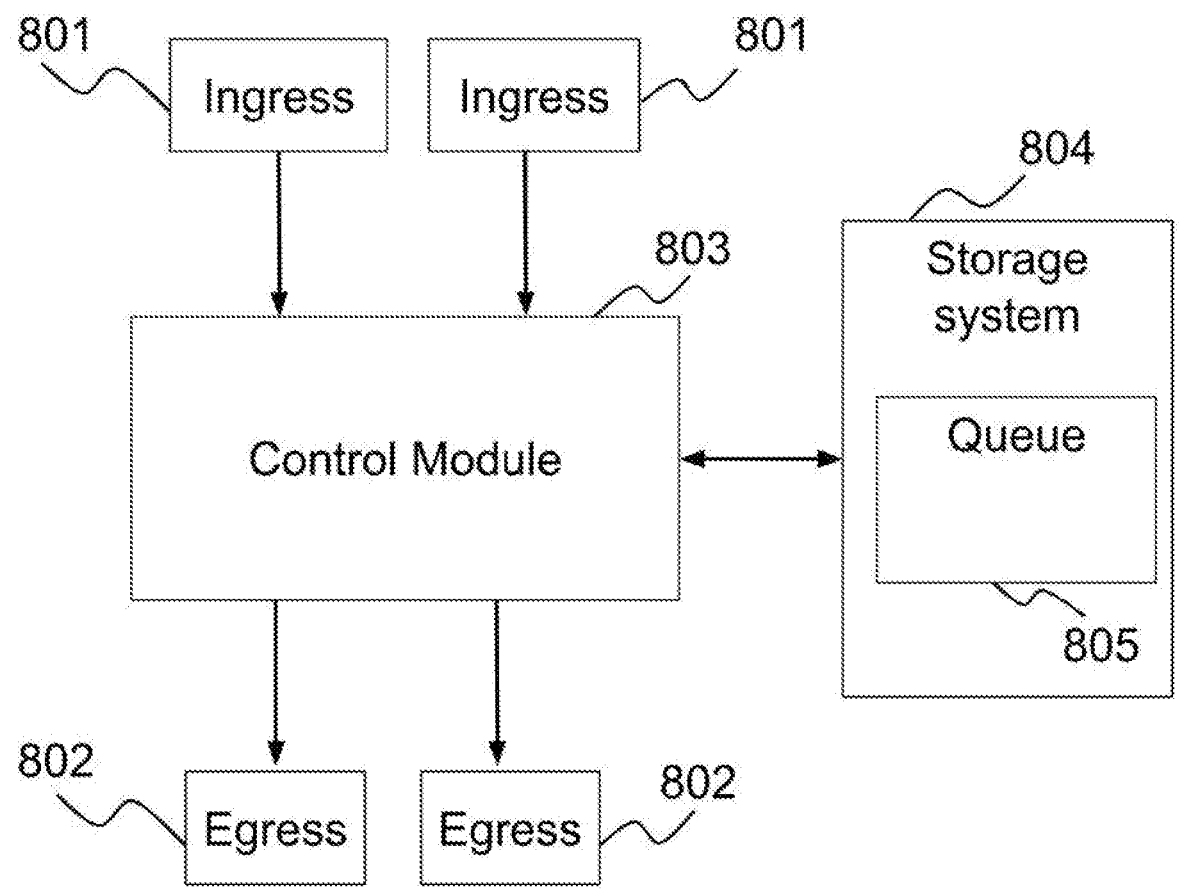
FIG. 8 is a block diagram of a destination network device according to an embodiment of the present invention.

FIG. 8 is a block diagram illustrating a system for processing packets received from bonded communication links according to the latency difference among the bonded communication links and sequence numbers of the packets received. Control module 803 may be a single control module, may be composed of multiple control modules or may include one or more control modules. Control module may be comprised of one or more CPUs, ASICs, MCUs, microprocessors, and/or any devices that are able to provide control functionalities. For example, to calculate latency difference, control module 803 compares the difference in arrival time of two packets which have consecutive sequence numbers arriving from two different links to estimate the latency difference among different links. The estimated latency differences may then be stored at storage system 804.

When a packet arrives at one of the ingress interfaces 801, control module 803 determines whether the packet arrived is from the link with the largest latency. If the packet is from the link with the largest latency, the packet should then be sent to one of the egress interfaces 802 depending on the destination of the packet. If the packet is not from the link with the largest latency, the packet should then be stored in queue 805 of storage system 804 for later delivery because the packet is assumed to be arriving earlier than other packets. Storage system 804 may be implemented by using DRAM, SDRAM, Flash RAM, optical memory, magnetic memory, hard disk, and/or any other materials that are able to provide storage capability. Queue 805 may be a section in storage system 804 or the whole of storage system 804.

In one embodiment, based on the sequence number of last packet delivered to egress interface 802, control module 803 determines the value of expected sequence number. For example, if the sequence number of last packet delivered to egress interface 802 is thirty-three, control module 803 may update the expected sequence number to be thirty-four to indicate the sequence number of next packet to be sent is expected to be thirty-four. Control module 803 compares the sequence number of a packet arrived from one of the ingress interfaces 801 against the expected sequence number. If the sequence number of the packet arrived is smaller than the expected sequence number, the packet is delivered without being stored in queue 805 because it is assumed the packet has arrived later than expected. If the sequence number of the packet arrived is not smaller than the expected sequence number and the packet is from the link with the largest latency, the packet should then be delivered to one of the egress interfaces 802 depending on the destination of the packet. On the other hand, if the sequence number of the packet arrived is not smaller than the expected sequence number and the packet is not from the link with the largest latency, the packet should then be stored in queue 805 of storage system 804 for later delivery because the packet is assumed to be arriving earlier than other packets.

Figure 9:
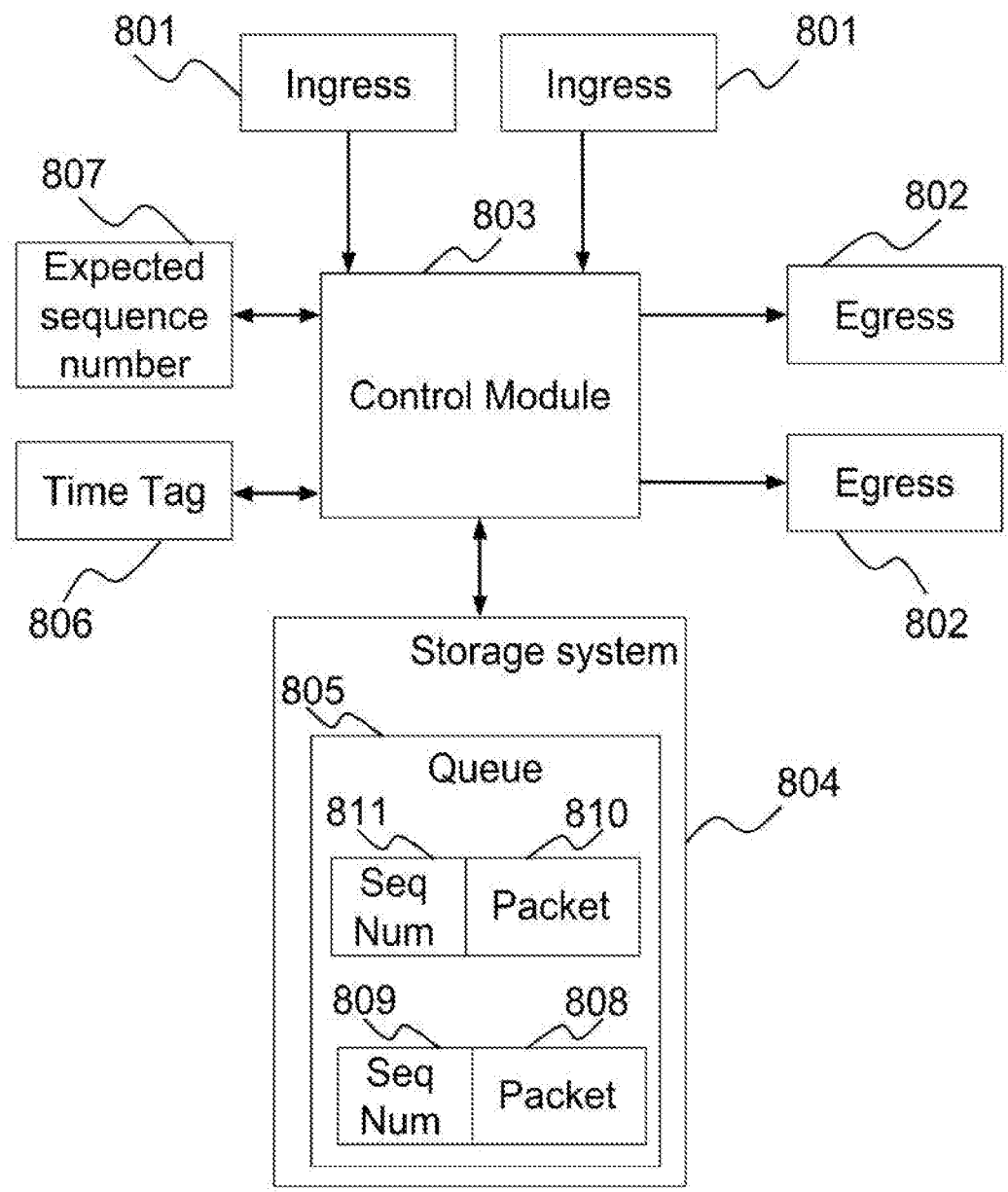
FIG. 9 is a block diagram of a destination network device according to an embodiment of the present invention with the use of a time tag and an expected sequence number.

FIG. 9 is an embodiment to illustrate how a system process packets that have been stored in a queue. When control module 803 stores a packet in queue 805, control module 803 stores the time when the packet is going to be examined again in time tag 806. The value of time tag 806 is based on latency difference. The time period for a packet staying in queue 805 may take into the account of latency difference, time tag 806, and/or a pre-defined value. Time tag 806 may be implemented by using DRAM, SDRAM, SRAM, or FLASH RAM placed inside control module 803 and/or part of storage system 804.

Control module 803 may periodically, for example for every five milliseconds, examine queue 805 to identify packets which may be ready for delivery. Control module 803 may also be alerted by time tag 806 for packet which may be ready for delivery.

For example, when packet 808 is identified for the possibility of delivery, control module 803 compares the sequence number 809 of packet 808 against expected sequence number 807. If the sequence number 809 is equal to expected sequence number 807, it means that the estimation of latency may still be accurate. Therefore control module 803 may send packet 808 to egress interface 802 for delivery.

If sequence number 809 is not equal to expected sequence number 807, it may be an indication that the estimation of latency difference may become inaccurate. Control module 803 then examines time tag 806 to determine whether packet 808 has been stored in queue 805 longer than the time limit threshold. Control module 803 delivers packet 808 if packet 808 has been stored in queue 805 for more than the time limit threshold. On the other hand, control module 803 may store packet 808 in queue 805 for a further period of time if packet 808 has not been stored in queue 805 for more than the time limit threshold. Control module 803 then modifies the value of time tag 806 to a new value that allows postponing the delivery of packet 808. The new value of time tag 806 should allow packet 808 to be re-examined by control module 803 within a time period which does not result in out-of-sequence delivery of packet 808. In one embodiment, the new value of time tag 806 is set to be five milliseconds, such that packet 808 will then be re-examined five milliseconds later and latency difference estimation may then also be updated. The time limit threshold can be any value estimated by control module 803, any device, selected by the device manufacturer, or inputted by a user of destination network device. According to experimental results, the optimal value for time limit threshold for 3G mobile link is in the range of seven hundred milliseconds to eight hundred milliseconds, whereas a typical ADSL or cable Ethernet link is in the range of two hundred and fifty milliseconds to three hundred milliseconds.

Control module 803 may determine, based on the sequence number of last packet delivered to egress interface 802, the value of expected sequence number 807. For example, if the sequence number of last packet delivered to egress interface 802 is thirty-three, control module 803 may update expected sequence number 807 to be thirty-four to indicate that the sequence number of next packet to be sent is expected to be thirty-four.

In one embodiment, control module 803 may determine whether the packet should be stored further in queue 805 or delivered to egress interface 802 solely based on whether the packet has been stored in queue 805 for more than the time limit threshold.

In one embodiment control module 803 takes into account of the sequence numbers of packets stored in queue 805 when processing packets. When control module 803 identifies a packet, for example packet 808, for the possibility of delivery, control module 803 compares the sequence number 809 of packet 808 against expected sequence number 807. If the sequence number 809 is equal to expected sequence number 807, control module 803 may send packet 808 to egress interface 802 for delivery.

If the sequence number 809 is not equal to expected sequence number 807, control module 803 then compares the lowest sequence number of the packet stored in queue against expected sequence number 807, for example sequence number 811 of packet 810. Control module 803 identifies packet 810 by, for example, examining the sequence numbers of all the packets stored in queue 805. If queue 805 is a sorted queue by sequence number, packet 810 may be placed at the top or bottom of queue 805

If control module 803 determines that sequence number 811 is equal to expected sequence number 807, control module 803 removes packet 810 from queue 805 to egress interface 802 for delivery. Further, control module 803 increases expected sequence number 807 by one to indicate that one packet has been removed from queue 805. Control module 803 then compares expected sequence number 807 against sequence number 809. If expected sequence number 809 is equal to sequence number 807, it means that the estimation of latency difference is still valid. Therefore, control module 803 removes packet 808 from queue 805 to egress interface 802 for delivery.

If sequence number 809 is not equal to expected sequence number 807, control module 803 then examines time tag 806 to determine whether packet 808 has been stored in queue 805 for more than a time limit threshold. If control module 803 determines that packet 808 has been stored in queue 805 for a period of time more than the time limit threshold, control module 803 retrieves packet 808 from queue 805 and deliver packet 808 to egress interface 802 for delivery. If packet 808 has been stored in the queue for a period of time not more than the time limit threshold, packet 808 may be stored in the queue for a further period of time. Control module 803 updates the value of time tag 806 to a new value that allows postponing the delivery of packet 808. The new value of time tag 806 should allow packet 808 to be re-examined within a period of time which does not result in out-of-sequence delivery of packet 808. In order to reduce the out-sequence packet delivery, in one embodiment, the new value of time tag 808 is set to be five milliseconds later.

In one embodiment, before control module 803 sends packet 808 to egress interface 802 for delivery, control module 803 checks if there are one or more packets stored in queue 805 with sequence numbers smaller or larger than the sequence number of the packet 808, these packets are sent to egress interface 802 first and then followed by the packet 808. If there are one or more packets stored in queue 805 with sequence number consecutively larger than the sequence number of packet 808, control module 803 sends these packets to egress interface 802 after packet 808.

In one embodiment, control module 803 updates expected sequence number 807 to be the sequence number of the packet just being sent to egress interface 802 plus one to indicate that the sequence number of the next packet expected to be sent to egress interface 802.

Figure 10:
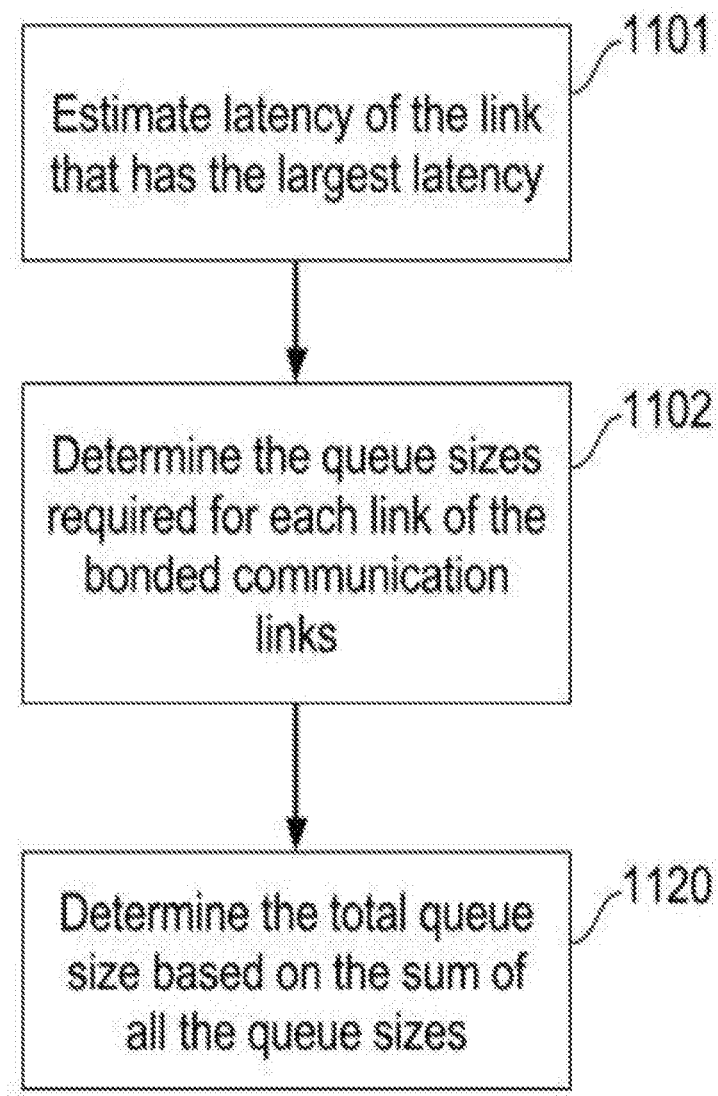
FIG. 10 is a flowchart illustrating a method according to an embodiment of the present invention, used to determine the total queue size based on the sum of all the queues sizes.

FIG. 10 illustrates a process to determine the total queue size required according to one of embodiments of the present invention. As a queue is required to store packets, it is preferred to have a queue that is large enough to store packets but not too large that consumes unnecessary resources and resulting in some of the queue not used.

In step 1101, the latency of the link with the largest latency is estimated. For readability, the latency of the link with the largest latency is referred to be Largest Latency. Those who are skilled in the art would appreciate that there are myriad ways of estimating latency, such as using ping command.

In step 1102, for each link in the bonded communication links, the queue size of the link is determined. The queue size is determined substantially based on the Largest Latency and the packets arrival speed of the particular link. Using FIG. 1A for illustration purpose, the latencies in links 110A, 110B and 110C are ten milliseconds, twenty milliseconds and fifteen milliseconds respectively. Bandwidth of links 110A, 110B and 110C are 30 Mbps, 20 Mbps and 10 Mbps. As link 110B has the largest latency of twenty milliseconds, Largest Latency is twenty milliseconds. As a result, the queue size for link 110A will be, 30 Mbps times twenty milliseconds, 75 kilobytes; the queue size for link 110C will be, 10 Mbps times twenty milliseconds, 25 kilobytes. There is no need to have a queue for link 110B as packets arrived from link 110B will be forwarded when the packets arrive.

In step 1120, the total queue size is the sum of all the queue sizes of all the links in the bonded communication links, excluding the link with the largest latency. Therefore, using the same illustration, the total queue size is the sum of 75 kilobytes and 25 kilobytes and is 100 kilobytes.

In one variance, in order to anticipate early arrival of packets from link 110B, a queue is also required for link 110B. The queue size of the queue for link 110B is preferred to be one quarter to one half of Largest Latency times its bandwidth. The queue size for link 110B at step 1102 therefore is in the range of 12.5 kilobytes (20 Mbps times five milliseconds) and 25 kilobytes (20 M times five milliseconds). The total queue size becomes 125 kilobytes in step 1120.

In one variance, all the links share one common queue and the queue size at step 1102 is flexible to store packets, which are arrived from lower latency links, that has not been stored longer than the Largest Latency. When a packet has been stored longer than the Largest Latency, the packet will be discarded in order to preserve storage of the queue. In one variance, each link has its own queue and the size of each queue is not fixed.

In one variance, packets are allowed to be stored for a time duration that is longer than the Largest Latency as long as the total queue size is not more than a predefined value. When the pre-defined queue size is reached, packets that have been stored the longest will be discarded. This allows more packets to be stored while not cause unexpected amount of storage being used for the queue. There are advantages and disadvantages to allow each link has its own queue when comparing to use one common queue.

In the case of allowing each link has its own queue, finer configuration can be achieved. For example, using the same illustration of FIG. 1A, the maximum queue size of link 110A is set to 1000 kilobytes and the time duration limit for packets to be stored is one second. Further, for links 110B and 110C, the maximum queue sizes and time duration limits can be configured individually. This reduce the probability that an unexpected rise of latency in one link or a sudden increase in bandwidth of one link will consume most of the available queue storage.

In the case of using one common queue, the common queue allows the benefits of statistical multiplexing and accommodate larger variance of latency and bandwidth of each link of the bonded communication links. For example, the total queue size for the common queue is set to five megabytes. In one variance, further, the allowed time duration of packet storage is set to five seconds. Therefore, when a packet arrives, if it is not being sent immediately, it will be stored in the common queue. If there is no storage left, packets that have been stored the longest will be discarded in order to create storage space for the newly arrived packet. In one variance, the size of the common queue is not based on a predefined value. Instead, the size of the common queue is based on the Largest Latency and bandwidth of each link of the bonded communication links.

INDUSTRIAL APPLICABILITY

This invention relates in general to network communications and, more particularly, to a method and system for processing packets received from bonded communication links according to latency difference among the bonded communication links and sequence numbers. Network traffic received from bonded communication links are delivered to a device, a network interface or a process of a destination network device in sequence with higher probability and less time variance comparing to a destination network device without implementing this invention.

The invention claimed is:

1. A method of storing packets at a destination network device, wherein the destination network device receives the packets from a source network device through bonded communication links, the method comprising:
  (a) determining latency of each of the bonded communication links;
  (b) determining latency difference among the bonded communication links according to (i) time difference of arrival of the packets at the destination network device and (ii) sequence numbers of the packets; wherein the sequence numbers indicate a sequence of the packets; wherein the latency difference is considered to be zero when the packets comprising consecutive sequence numbers are received consecutively through one bonded communication link of the bonded communication links;
  (c) determining a queue storage size for each of the bonded communication links;
  (d) determining a total queue storage size; wherein the total queue storage size is a sum of the queue storage size for each of the bonded communication links;

(e) when receiving the packets from the bonded communication links, determining, based on at least one of, (i) the latency difference, (ii) the sequence numbers and (iii) an estimated sequence number, whether to store the packets in a queue storage or to forward the packets; wherein the queue storage is allocated according to the total queue storage size; wherein the estimated sequence number is determined by comparing a sequence number of a packet against an expected sequence number of a next packet:
  (i) when determined to store the packets in the queue storage, storing the packets in the queue storage;
  (ii) when determined to forward the packets, forwarding the packets; and
wherein the packets are received by the destination network device without any particular order.

2. The method of claim 1, wherein the queue storage size is determined based on the latency difference and bandwidth of each of the bonded communication links.

3. The method of claim 1, wherein the queue storage is comprised of a plurality of individual queue storages; and wherein each of the plurality of individual queue storages corresponds to each bonded communication link of the bonded communication links.

4. The method of claim 1, further comprising determining period of time of storing in the queue storage for each of the packets stored at step (e)(i).

5. The method of claim 1, wherein the queue storage size is based on an allowed time duration of packet storage.

6. The method of claim 5, wherein the allowed time duration is configurable.

7. The method of claim 5, wherein the allowed time duration is based on the latency difference.

8. The method of claim 1, wherein the total queue storage size is not larger than a pre-configured size.

9. The method of claim 1, further comprising discarding the packets have been stored the longest at step (e)(i) when the queue storage is inadequate.

10. The method of claim 1, further comprising re-determining the latency of each of the bonded communication links to re-determine the latency difference among the bonded communication links when one or more bonded communication links are added or deleted between the source device and the destination device.

11. A system of storing packets at a destination network device, wherein the destination network device receives the packets from a source network device through bonded communication links, the system comprising:
  one or more network interfaces for receiving the packets from the bonded communication links,
  at least one storage system,
  at least one processing unit, and
  one or more control modules configured to be executable by the at least one processing unit for:
    (a) determining latency of each of the bonded communication links;
    (b) determining latency difference among the bonded communication links according to (i) time difference of arrival of the packets at the destination network device and (ii) sequence numbers of the packets; wherein the sequence numbers are to indicate a sequence of the packets; wherein the latency difference is considered to be zero when the packets comprising consecutive sequence numbers are received consecutively through one bonded communication link of the bonded communication links;
    (c) determining a queue storage size for each of the bonded communication links;
    (d) determining a total queue storage size; wherein the total queue storage size is a sum of the queue storage size for each of the bonded communication links;
    (e) when receiving the packets from the bonded communication links, determining, based on at least one of, (i) the latency difference, (ii) the sequence numbers and (iii) an estimated sequence number, whether to store the packets in a queue storage or to forward the packets; wherein the queue storage is allocated according to the total queue storage size; wherein the estimated sequence number is determined by comparing a sequence number of a packet against an expected sequence number of a next packet:
      (i) when determined to store the packets in the queue storage, storing the packets in the queue storage;
      (ii) when determined to forward the packets, forwarding the packets; and
    wherein the packets are received by the destination network device without any particular order.

12. The system of claim 11, wherein the queue storage size is determined based on the latency difference and bandwidth of each of the bonded communication links.

13. The system of claim 11, wherein the queue storage is comprised of a plurality of individual queue storages; wherein each of the plurality of individual queue storages corresponds to each bonded communication link of the bonded communication links.

14. The system of claim 11, wherein the one or more control modules are further configured to be executable by the at least one processing unit for determining storing period of time in the queue storage for each of the packets stored at step (e)(i).

15. The system of claim 11, wherein the queue storage size is based on an allowed time duration of packet storage.

16. The system of claim 15, wherein the allowed time duration is configurable.

17. The system of claim 15, wherein the allowed time duration is based on the latency difference.

18. The system of claim 11, wherein the total queue storage size is not larger than a pre-configured size.

19. The system of claim 11, wherein the one or more control modules are further configured to be executable by the at least one processing unit for discarding the packets that have been stored the longest at step (e)(i) when the queue storage is inadequate.

20. The system of claim 11, wherein the one or more control modules are further configured to be executable by the at least one processing unit for re-determining the latency of each of the bonded communication links to re-determine the latency difference among the bonded communication links when one or more bonded communication links are added or deleted between the source device and the destination device.

* * * * *